US009871656B2

(12) United States Patent
Yao et al.

(10) Patent No.: US 9,871,656 B2
(45) Date of Patent: Jan. 16, 2018

(54) ENCRYPTED COMMUNICATION METHOD AND APPARATUS

(71) Applicant: Datang Mobile Communications Equipment Co., Ltd., Beijing (CN)

(72) Inventors: Jinhua Yao, Beijing (CN); Bingjie Liang, Beijing (CN); Xing Wu, Beijing (CN); Zhuo Qin, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days.

(21) Appl. No.: 15/314,232

(22) PCT Filed: May 27, 2015

(86) PCT No.: PCT/CN2015/079985
§ 371 (c)(1),
(2) Date: Nov. 28, 2016

(87) PCT Pub. No.: WO2015/180654
PCT Pub. Date: Dec. 3, 2015

(65) Prior Publication Data
US 2017/0118026 A1    Apr. 27, 2017

(30) Foreign Application Priority Data

May 28, 2014   (CN) .......................... 2014 1 0231671

(51) Int. Cl.
*H04L 29/06*       (2006.01)
*H04L 9/32*        (2006.01)
(Continued)

(52) U.S. Cl.
CPC .......... *H04L 9/3242* (2013.01); *H04L 9/0643* (2013.01); *H04L 9/0822* (2013.01);
(Continued)

(58) Field of Classification Search
None
See application file for complete search history.

(56) References Cited

U.S. PATENT DOCUMENTS 7,178,025 B2 * 2/2007 Scheidt .................. G06F 21/31
                                                        705/67
7,441,043 B1 * 10/2008 Henry ................ H04L 29/1233
                                                        709/238
(Continued)

FOREIGN PATENT DOCUMENTS

CN          1816213 A        8/2006
CN          101009551        8/2007
(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*
(Continued)

Primary Examiner — Jeremiah Avery
(74) Attorney, Agent, or Firm — DLA Piper LLP (US)

(57) ABSTRACT

Provided are a method and apparatus for achieving encrypted communications, which are used for achieving a secure session between a calling UE and a called UE in an IP multimedia subsystem (IMS) architecture, so as to prevent a session message from being eavesdropped in a session process. The method of the present invention comprises: receiving, by a network-side device, first authentication information sent by a UE, and according to the first authentication information, conducting authentication on an encrypted module of the UE; generating a transmission key corresponding to the UE and second authentication information, encrypting the transmission key using an initial key corresponding to the UE, and sending the second authentication information and the encrypted transmission key to the
(Continued)

UE; and generating a session key for encrypting a session message transmitted between a calling UE and a called UE, encrypting the session key using the transmission key corresponding to a calling UE and sending the encrypted session key to the calling UE, and encrypting the session key using the transmission key corresponding to the called UE and sending the encrypted session key to the called UE.

20 Claims, 8 Drawing Sheets

(51) Int. Cl.
    H04W 12/04    (2009.01)
    H04W 12/06    (2009.01)
    H04L 9/06    (2006.01)
    H04L 9/08    (2006.01)
    H04L 9/14    (2006.01)
    H04L 12/58    (2006.01)
    H04L 29/12    (2006.01)
    H04M 7/00    (2006.01)

(52) U.S. Cl.
    CPC .............. *H04L 9/0861* (2013.01); *H04L 9/14* (2013.01); *H04L 51/04* (2013.01); *H04L 61/6022* (2013.01); *H04L 63/06* (2013.01); *H04L 63/083* (2013.01); *H04L 65/1069* (2013.01); *H04W 12/04* (2013.01); *H04W 12/06* (2013.01); *H04L 65/1016* (2013.01); *H04L 65/1073* (2013.01); *H04M 7/006* (2013.01)

(56) References Cited

U.S. PATENT DOCUMENTS

| | | | | |
|---|---|---|---|---|
| 8,126,145 | B1* | 2/2012 | Tewari | H04L 9/0841 370/401 |
| 8,230,219 | B2* | 7/2012 | Ho | H04L 9/0841 713/168 |
| 8,661,254 | B1* | 2/2014 | Sama | H04L 9/3215 380/247 |
| 9,002,018 | B2* | 4/2015 | Wilkins | H04L 9/006 380/281 |
| 2003/0041244 | A1* | 2/2003 | Buttyan | G06Q 20/20 713/172 |
| 2005/0195975 | A1* | 9/2005 | Kawakita | H04L 9/0822 380/30 |
| 2006/0149962 | A1* | 7/2006 | Fountain | H04L 63/0428 713/151 |
| 2007/0106892 | A1* | 5/2007 | Engberg | G06Q 20/02 713/168 |
| 2008/0022089 | A1* | 1/2008 | Leedom | H04L 63/068 713/156 |
| 2010/0306542 | A1* | 12/2010 | Funk | H04L 9/0822 713/171 |
| 2011/0208965 | A1* | 8/2011 | MacHani | H04L 63/0435 713/168 |
| 2011/0213969 | A1* | 9/2011 | Nakhjiri | H04L 63/061 713/158 |
| 2013/0103939 | A1* | 4/2013 | Radpour | H04L 9/083 713/152 |

FOREIGN PATENT DOCUMENTS

| | | |
|---|---|---|
| CN | 101272297 A | 9/2008 |
| CN | 101635924 | 1/2010 |
| CN | 102724041 A | 10/2012 |
| CN | 103987037 A | 8/2014 |
| CN | 104683098 | 6/2015 |
| CN | 104683304 | 6/2015 |
| EP | 1 946 479 | 3/2007 |
| JP | 2011-217025 A | 10/2011 |

OTHER PUBLICATIONS

Bruce, Ndibanje; Lee, Hoon Jae. Cryptographic Computation of Private Shared Key based Mutual Authentication Protocol: Simulation and Modeling over Wireless Networks. 2014 International Conference on Information Networking (ICOIN). http://ieeexplore.ieee.org/stamp/stamp.jsp?arnumber=6799747.*

Shankaran, Rajan; Varadharajan, Vijay; Hitchens, Michael. Secure Multicast Extensions for Mobile Networks. Conference on Local Computer Networks, 1999. LCN '99. http://ieeexplore.ieee.org/stamp/stamp.jsp?arnumber=802004.*

Baldwin, Adrian; Shiu, Simon. Encryption and Key management in a SAN. First International IEEE Security in Storage Workshop. Pub. Date: 2002. http://ieeexplore.ieee.org/stamp/stamp.jsp?arnumber=1183508.*

Supplementary European Search Report dated Apr. 3, 2017, of corresponding European Application No. 15800408.5.

* cited by examiner

ENCRYPTED COMMUNICATION METHOD AND APPARATUS

This application is a US National Stage of International Application No. PCT/CN2015/079985, filed on 27 May 2015, designating the United States, and claiming the benefit of Chinese Patent Application No. 201410231671.9, filed with the State Intellectual Property Office of People's Republic of China on May 28, 2014 and entitled "Encrypted communication method and apparatus", which is hereby incorporated by reference in its entirety.

FIELD

The present invention relates to the field of communications and particularly to an encrypted communication method and apparatus.

BACKGROUND

As the 4G network technologies are becoming mature and widely applied, the Voice over IP (VoIP) communication service enabled by the IP Multimedia Sub System (IMS) technology has been more widely applied due to the inherent advantages of access-independency, separation of services from the control layer, etc., of the technology system of the IMS.

In the standard IMS system architecture, a Call Session Control Function (CSCF) in the system operates as a subscriber register server to provide a User Equipment (UE) with a registration service, and to provide the UE with routing and trigger control in call and short message services, and an Application Server (AS) handles a service to the subscriber. The CSCF can be categorized into three different logic entities by their different functions:

A Proxy-CSCF (P-CSCF) is an entrance for an access of the UE to the IME, the P-CSCF is a proxy server of a Subscriber Interface Processor (SIP) and capable of forwarding bidirectional signaling flows.

An Interrogating CSCF (I-CSCF) provides the UE with an entrance to a home network of the UE, and hides the topology of the home network from other networks.

A Serving CSCF (S-CSCF) is the core of the IMS domain, and the S-CSCF performs session control on the UE, and maintains a session state required for the service.

These three logic entities, i.e., the P-CSCF, the I-CSCF, and the S-CSCF can be separated or combined dependent upon an application scenario. If there are a small number of UEs served by the network, then the three logic entities can be combined into a logic entity. For the sake of a convenient description, these three logic entities are referred collectively to as the CSCF, and the functions of the CSCF include all the functions of these three logic entities.

In the IMS system architecture, a general service flow of a session service includes an IMS registration flow and an IMS call flow, and as illustrated in FIG. 1, the standard IMS registration flow is as follows:

S101. The UE sends a subscriber registration request message, including the UE identifier of the UE, to the CSCF;

S102. The CSCF sends a challenge response message carrying a random number RAND, and an authentication vector AUTN (including an MAC and an SQN) to the UE to instruct the UE to authenticate on the IMS network;

S103. The UE authenticates the IMS network upon reception of the challenge response message sent by the CSCF; and in a particular authentication method, the UE calculates an Expect Message Authentication Code (XMAC) value as specified in the 3GPP TS 33.102, and if the XMAC value is the same as the MAC value carried in the challenge response message, and the Sequence Number (SQN) lies in a preset range of values, then the UE determines that the authentication on the IMS network is passed; and after the authentication is passed, the UE calculates a response value RES from the random number RAND, and a key IK of the UE;

S104. The UE resends a subscriber registration request carrying the response value RES to the CSCF;

S105. The CSCF receives the subscriber registration request resent by the UE, and if the response value RES carried in the subscriber registration request is the same as a locally stored Expected Response Value (XRES), then the CSCF determines that the authentication on the UE is passed; and the CSCF retrieves subscriber data of the UE from a Home Subscriber Server (HSS);

S106. The CSCF triggers a service according to the subscriber data, and initiates third-party registration with the AS;

S107. The CSCF sends a subscriber registration success response message to the UE after the UE is registered successfully;

S108. The AS performs third-party subscriber registration on the UE upon reception of the third-party subscriber registration request sent by the CSCF; and S109. The AS sends a third-party subscriber registration success response message to the CSCF after finishing the third-party subscriber registration on the UE.

After the IMS registration flow is finished, the UE can initiates a call, short message or another IMS service over the IMS network.

As illustrated in FIG. 2, the standard IMS call flow is as follows:

S201. The UE which is a calling UE sends a call request message carrying the UE identifier of the calling UE and the UE identifier of a called UE to the CSCF;

S202. The CSCF triggers a service according to subscriber data of the calling UE and the called UE, and forwards the call request message to the AS, upon reception of the call request message; and the CSCF sends the call request message to the called UE according to address information carried by the called UE being registered;

S203. The called UE sends a call response message to the calling UE through the CSCF and the AS upon reception of the call request message;

S204. The called UE sends a hook-off request message to the calling UE through the CSCF and the AS after being hooked off;

S205. The calling UE sends a hook-off response message to the called UE through the CSCF and the AS upon reception of the hook-off request message;

So far a session is set up between the calling UE and the called UE so that a normal communication process can be performed between the calling UE and the called UE;

S206. After the communication between the calling UE and the called UE is terminated, the calling UE is hooked on and sends a hook-on request message to the called UE through the CSCF and the AS; and S207. The called UE is hooked on, and sends a hook-on response message to the calling UE through the CSCF and the AS, upon reception of the hook-on request message.

In the IMS registration flow and the IMS call flow above, only the provision of the sessions service is concerned with, so the session messages during the session between the calling UE and the called UE can not be secured effectively. As illustrated in FIG. 3, during the session between the calling UE and the called UE, at this time the session messages are unencrypted plaint-text session messages, so all the contents of communication between the calling UE and the called UE are exposed so that the session messages may be easily wiretapped by an illegal wiretap, thus greatly endangering the session.

SUMMARY

The invention provides an encrypted communication method and apparatus so as to secure a session between a calling UE and a called UE in an IMS system to thereby prevent a session message during the session from being wiretapped.

An embodiment of the invention provides an encrypted communication method including:
  receiving, by a network-side device, first authentication information sent by a User Equipment (UE), and authenticating on an encryption module of the UE according to the first authentication information;
  if the authentication on the encryption module of the UE is passed, then generating, by the network-side device, a transmission key corresponding to the UE, and second authentication information, encrypting the transmission key using an initial key corresponding to the UE, and sending the second authentication information and the encrypted transmission key to the UE, wherein the second authentication information is used by the UE to authenticate on the network-side device; and
  if the network-side device receives a session setup request sent by the UE which is a calling UE after the authentication on the network-side device by the UE using the second authentication information is passed, then generating, by the network-side device, a session key for encrypting a session message transmitted between the calling UE and a called UE, encrypting the session key using the transmission key corresponding to the calling UE and sending the encrypted session key to the calling UE, and encrypting the session key using a transmission key corresponding to the called UE and sending the encrypted session key to the called UE.

As can be apparent seen from the method above, the network-side device authenticates on the UE, and sends the second authentication information to the UE to instruct the UE to authenticate on the network-side device, thus enabling bidirectional authentication between the network-side and the UE; and in this process, the network-side device sends the transmission key corresponding to the UE to the UE; and subsequent to the bidirectional authentication, the network-side device sends the session key encrypted using the transmission keys corresponding to the calling UE and the called UE to the corresponding calling UE and called UE respectively, so that the calling UE and the called UE encrypt and transmit the session message using the session key during the session to thereby secure the session between the calling UE and the called UE in the IMS system so as to prevent the session message from being wiretapped during the session.

Preferably the first authentication information includes a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

Thus the network-side device authenticates the encryption module of the UE according to the first authentication information.

Preferably authenticating, by the network-side device, on the encryption module of the UE according to the first authentication information includes:
  determining a local subscriber password hash value according to the UE identifier; if the local subscriber password hash value is the same as the subscriber password hash value in the first authentication information, then encrypting the random number using the local initial key corresponding to the UE; if the random number encrypted using the local initial key corresponding to the UE is the same as the encrypted random number in the first authentication information, then calculating an MAC value corresponding to the encrypted random number using the subscriber password; and if the MAC value is the same as the MAC value in the first authentication information, then determining that the authentication on the encryption module of the UE is passed.

Thus the network-side device authenticates on the encryption module of the UE.

Preferably generating, by the network-side device, the second authentication information includes:
  encrypting the generated transmission key corresponding to the UE into the encrypted transmission key using the local initial key corresponding to the UE; and
  calculating an MAC value corresponding to the encrypted transmission key from the subscriber password, and determining the MAC value as the second authentication information.

Thus the UE authenticates on the network-side device according to the second authentication information generated by the network-side device.

Preferably after the network-side device generates the transmission key corresponding to the UE, the method further includes:
  creating a correspondence relationship between the transmission key and the UE identifier of the UE corresponding to the transmission key; and
  encrypting the transmission key corresponding to the UE using the subscriber password of the UE, and storing the encrypted transmission key and the correspondence relationship.

Thus the network-side device subsequently searches using the UE identifier of the UE for the locally stored transmission key corresponding to the UE.

Preferably the method further includes:
  if the UE initiates an instant messaging service, then receiving, by the network-side device, an encrypted first random number, and an encrypted instant message, sent by the UE which is the calling UE, wherein the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;
  decrypting, by the network-side device, the encrypted first random number using the transmission key corresponding to the calling UE, and decrypting the encrypted instant message using the transmission key corresponding to the calling UE, and the first random number;

generating, by the network-side device, an instant message key, encrypting the instant message key into the encrypted instant message key using the transmission key corresponding to the called UE, and encrypting the instant message into the encrypted instant message using the instant message key; and sending, by the network-side device, the encrypted instant message key and the encrypted instant message to the called UE.

Thus the network-side device encrypts the instant messaging service initiated by the UE.

An embodiment of the invention provides an encrypted communication method including:

generating, by a User Equipment (UE), first authentication information, and sending the first authentication information to a network-side device, wherein the first authentication information is used by the network-side device to authenticate on an encryption module of the UE;

receiving, by the UE, second authentication information, and an encrypted transmission key, sent by the network-side device, and authenticating on the network-side device according to the second authentication information, wherein the encrypted transmission key is generated by the network-side device encrypting a generated transmission key corresponding to the UE using an initial key corresponding to the UE;

decrypting, by the UE, the encrypted transmission key using the initial key corresponding to the UE;

if the authentication by the UE on the network-side device using the second authentication information is passed, then sending, by the UE which is a calling UE, a session setup request to the network-side device;

receiving, by the UE, an encrypted session key sent by the network-side device, and decrypting the encrypted session key using the transmission key generated as a result of decryption; and encrypting and transmitting, by the UE, a session message transmitted between the UE and an opposite UE using a session key generated as a result of decryption.

As can be apparent seen from the method above, the UE sends the first authentication information to the network-side device to instruct the network-side device to authenticate on the UE, and authenticates on the network-side device according to the second authentication information sent by the network-side device, thus enabling bidirectional authentication between the network-side device and the UE; and in this process, the UE receives and decrypts the transmission key corresponding to the UE sent by the network-side device so that the UE subsequently decrypts the encrypted session key using the transmission key; and subsequent to the bidirectional authentication, the calling UE and the called UE receive respectively the encrypted session key sent by the network-side device so that the calling UE and the called UE encrypt and transmit the session message using the session key during the session to thereby secure the session between the calling UE and the called UE in the IMS system so as to prevent the session message from being wiretapped during the session.

Preferably the first authentication information includes a UE identifier, a subscriber password hash value, a random number, an encrypted random number, and a Message Authentication Code (MAC) value corresponding to an encrypted random number calculated from a subscriber password, where the encrypted random number is a random number encrypted using the initial key corresponding to the UE.

Thus the network-side device is instructed to authenticate the encryption module of the UE according to the first authentication information.

Preferably the second authentication information includes an MAC value corresponding to the encrypted transmission key calculated by the network-side device from the subscriber password, where the encrypted transmission key is generated by the network-side device encrypting the transmission key corresponding to the UE using the initial key corresponding to the UE.

Thus the UE authenticates on the network-side device according to the second authentication information.

Preferably authenticating, by the UE, on the network-side device according to the second authentication information includes:

calculating an MAC value corresponding to the encrypted transmission key from the subscriber password, and if the locally calculated MAC value is the same as the MAC value in the second authentication information, then determining that the authentication on the network-side device is passed.

Thus the UE authenticates on the network-side device.

Preferably after the UE decrypts the encrypted transmission key using the initial key corresponding to the UE, the method further includes:

encrypting the decrypted transmission key using the subscriber password of the UE, and storing the encrypted transmission key.

Thus the UE decrypts using the locally stored transmission key the encrypted session key sent by the network-side device into the session key for encrypting the session message during the session between the UE and the opposite UE.

Preferably the method further includes:

if the UE which is the calling UE initiates an instant message service, then generating, by the calling UE, a first random number randomly, encrypting the first random number into the encrypted first random number using the transmission key corresponding to the UE, and encrypting an instant message into the encrypted instant message using the transmission key corresponding to the UE, and the first random number;

sending, by the calling UE, the encrypted first random number and the encrypted instant message to the network-side device;

receiving, by a called UE, an encrypted instant message key, and the encrypted instant message, sent by the network-side device, wherein the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and decrypting, by the called UE, the encrypted instant message key into the instant message key using the transmission key corresponding to the called UE, and decrypting the encrypted instant message into the instant message using the instant message key.

Thus the instant messaging service initiated by the UE is encrypted.

An embodiment of the invention provides an encrypted communication apparatus including:

a module authenticating unit configured to receive first authentication information sent by a User Equipment (UE), and to authenticate on an encryption module of the UE according to the first authentication information;

an information processing unit configured, if the authentication on the encryption module of the UE is passed, to generate a transmission key corresponding to the UE, and second authentication information, to encrypt the transmission key using an initial key corresponding to the UE, and to send the second authentication information and the encrypted transmission key to the UE, wherein the second authentication information is used by the UE to authenticate on the network-side device; and a session request processing unit configured, if a session setup request sent by the UE which is a calling UE is received, after the authentication on the network-side device by the UE using the second authentication information is passed, to generate a session key for encrypting a session message transmitted between the calling UE and a called UE, to encrypt the session key using the transmission key corresponding to the calling UE and to send the encrypted session key to the calling UE, and to encrypt the session key using a transmission key corresponding to the called UE and to send the encrypted session key to the called UE.

Preferably the first authentication information includes a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

Thus the module authenticating unit authenticates on the encryption module of the UE according to the first authentication information.

Preferably the module authenticating unit configured to authenticate on the encryption module of the UE according to the first authentication information is configured:

to determine a local subscriber password hash value according to the UE identifier; if the local subscriber password hash value is the same as the subscriber password hash value in the first authentication information, to encrypt the random number using the local initial key corresponding to the UE; if the random number encrypted using the local initial key corresponding to the UE is the same as the encrypted random number in the first authentication information, to calculate an MAC value corresponding to the encrypted random number using the subscriber password; and if the MAC value is the same as the MAC value in the first authentication information, to determine that the authentication on the encryption module of the UE is passed.

Thus the module authenticating unit authenticates on the encryption module of the UE.

Preferably the information processing unit configured to generate the second authentication information is configured:

to encrypt the generated transmission key corresponding to the UE into the encrypted transmission key using the local initial key corresponding to the UE; and to calculate an MAC value corresponding to the encrypted transmission key from the subscriber password, and to determine the MAC value as the second authentication information.

Thus the UE authenticates on the network-side device according to the second authentication information generated by the network-side device.

Preferably the information processing unit is further configured, after the transmission key corresponding to the UE is generated, to:

to create a correspondence relationship between the transmission key and the UE identifier of the UE corresponding to the transmission key; and to encrypt the transmission key corresponding to the UE using the subscriber password of the UE, and to store the encrypted transmission key and the correspondence relationship.

Thus the locally stored transmission key corresponding to the UE is subsequently searched for using the UE identifier of the UE.

Preferably the apparatus further includes:

an instant service processing unit configured, if the UE initiates an instant messaging service, to receive an encrypted first random number, and an encrypted instant message, sent by the UE which is the calling UE, wherein the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;

to decrypt the encrypted first random number using the transmission key corresponding to the calling UE, and to decrypt the encrypted instant message using the transmission key corresponding to the calling UE, and the first random number;

to generate an instant message key, to encrypt the instant message key into the encrypted instant message key using the transmission key corresponding to the called UE, and to encrypt the instant message into the encrypted instant message using the instant message key; and to send the encrypted instant message key and the encrypted instant message to the called UE.

Thus the instant messaging service initiated by the UE is encrypted.

An embodiment of the invention provides an encrypted communication apparatus including:

a first information processing unit configured to generate first authentication information, and to send the first authentication information to a network-side device, wherein the first authentication information is used by the network-side device to authenticate on an encryption module of the UE;

a second information processing unit configured to receive second authentication information, and an encrypted transmission key, sent by the network-side device, and to authenticate on the network-side device according to the second authentication information, wherein the encrypted transmission key is generated by the network-side device encrypting a generated transmission key corresponding to the UE using an initial key corresponding to the UE; and to decrypt the encrypted transmission key using the initial key corresponding to the UE; and a session request processing unit configured, if the authentication on the network-side device using the second authentication information is passed, to send a session setup request to the network-side device; to receive an encrypted session key sent by the network-side device, and to decrypt the encrypted session key using the transmission key generated as a result of decryption; and to encrypt and transmit a session message transmitted between the UE and an opposite UE using a session key generated as a result of decryption.

Preferably the first authentication information includes a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

Thus the network-side device is instructed to authenticate on the encryption module of the UE using the first authentication information.

Preferably the second authentication information includes an MAC value corresponding to the encrypted transmission key calculated by the network-side device from the subscriber password, wherein the encrypted transmission key is generated by the network-side device encrypting the transmission key corresponding to the UE using the initial key corresponding to the UE.

Thus the UE authenticates on the network-side device according to the second authentication information.

Preferably the second information processing unit configured to authenticate on the network-side device according to the second authentication information is configured:
  to calculate an MAC value corresponding to the encrypted transmission key from the subscriber password, and if the locally calculated MAC value is the same as the MAC value in the second authentication information, to determine that the authentication on the network-side device is passed.

Thus the second information processing unit authenticates on the network-side device.

Preferably the second information processing unit is further configured, after the encrypted transmission key is decrypted using the initial key corresponding to the UE, to:
  to encrypt the decrypted transmission key using the subscriber password of the UE, and to store the encrypted transmission key.

Thus the encrypted session key sent by the network-side device is decrypted using the locally stored transmission key into the session key for encrypting the session message during the session between the UE and the opposite UE.

Preferably the apparatus further includes:
an instant service processing unit configured, if an instant message service is initiated, to generate randomly a first random number, to encrypt the first random number into the encrypted first random number using the transmission key corresponding to the UE, and to encrypt an instant message into the encrypted instant message using the transmission key corresponding to the UE, and the first random number;
  to send the encrypted first random number and the encrypted instant message to the network-side device;
  to receive an encrypted instant message key, and the encrypted instant message, sent by the network-side device, wherein the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and
  to decrypt the encrypted instant message key into the instant message key using the transmission key corresponding to the UE, and to decrypt the encrypted instant message into the instant message using the instant message key.

Thus the instant messaging service initiated by the UE is encrypted.

DETAILED DESCRIPTION OF THE EMBODIMENTS

Embodiments of the invention provide an encrypted communication method and apparatus so as to secure a session between a calling UE and a called UE in an IMS system to thereby prevent a session message during the session from being wiretapped.

Figure 1:
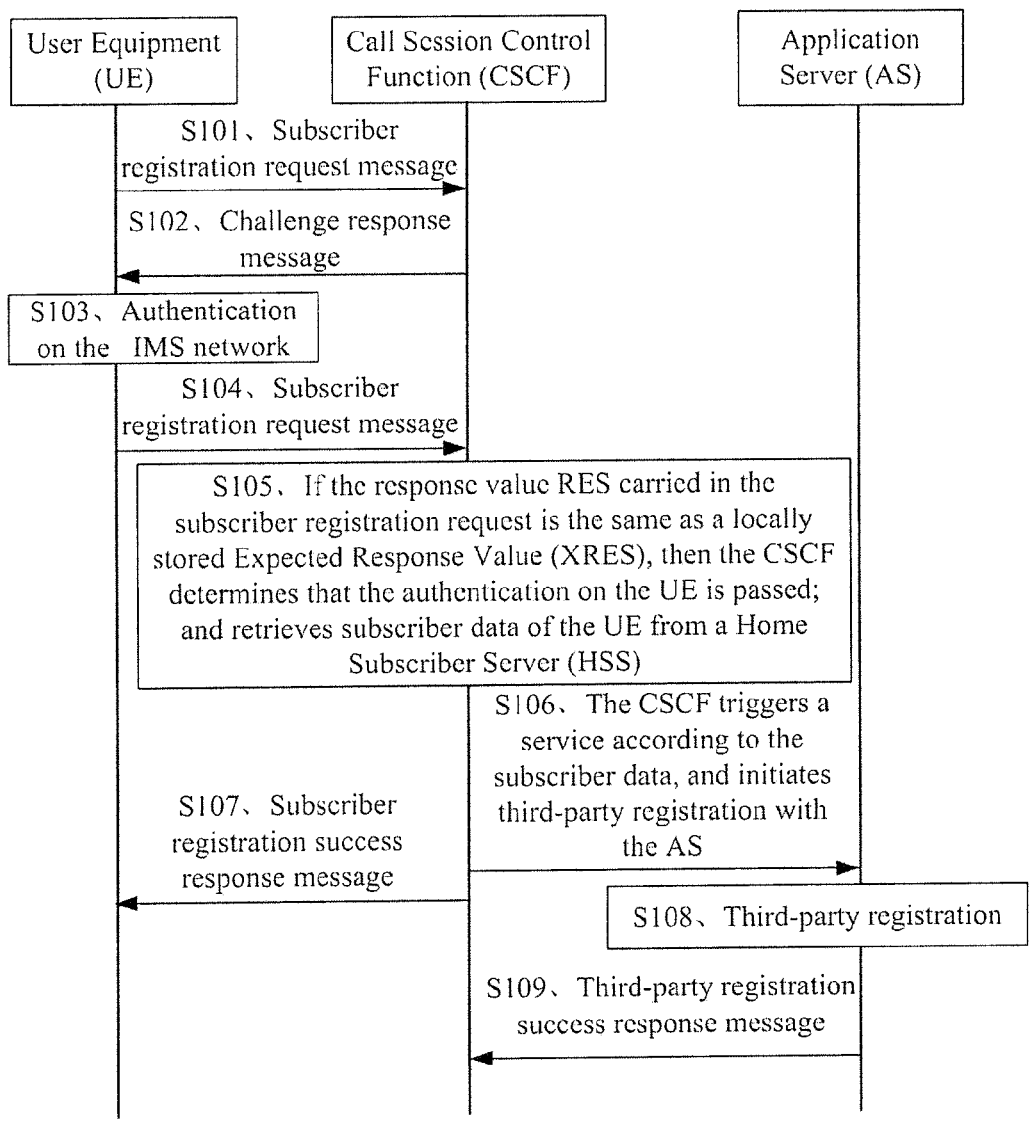
FIG. 1 is a schematic diagram of the standard IMS registration flow.
Figure 2:
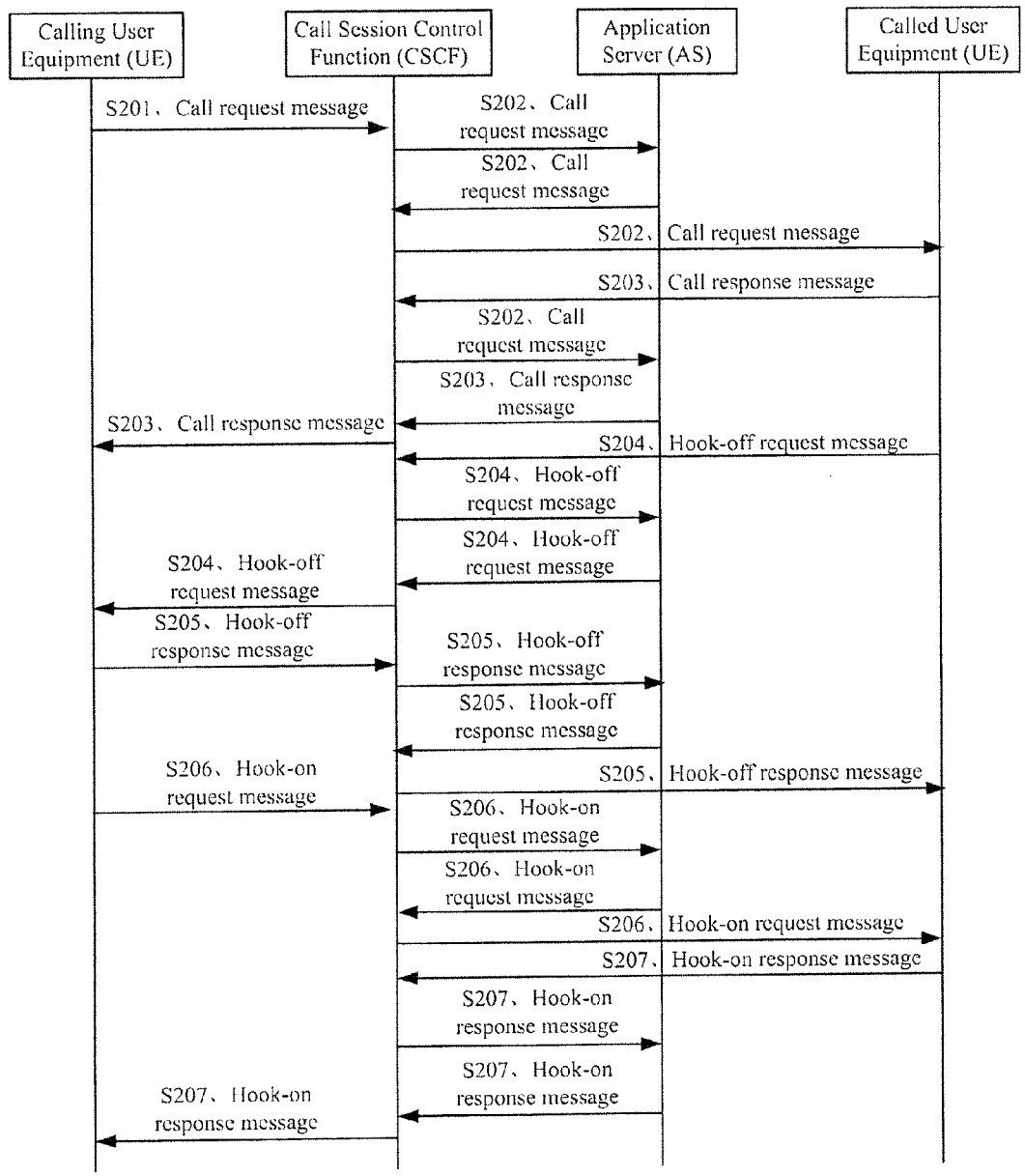
FIG. 2 is a schematic diagram of the standard IMS call flow.
Figure 3:
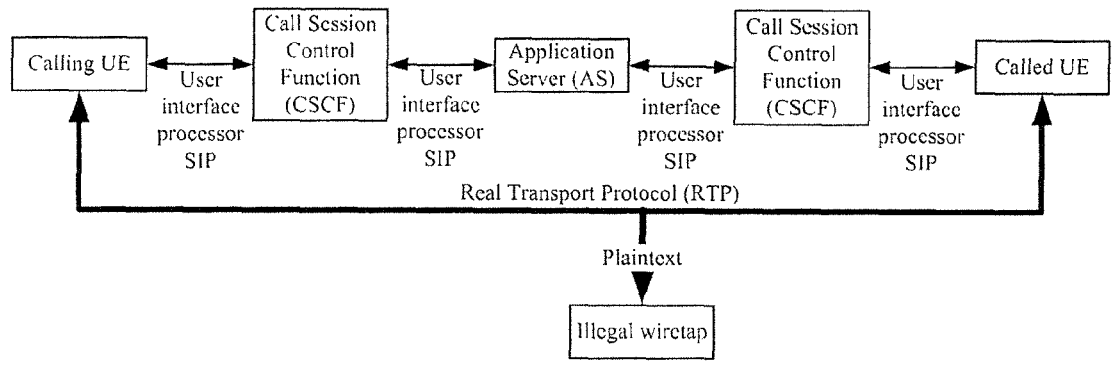
FIG. 3 is a schematic diagram of the principle that the IMS-based session is wiretapped.
Figure 4:
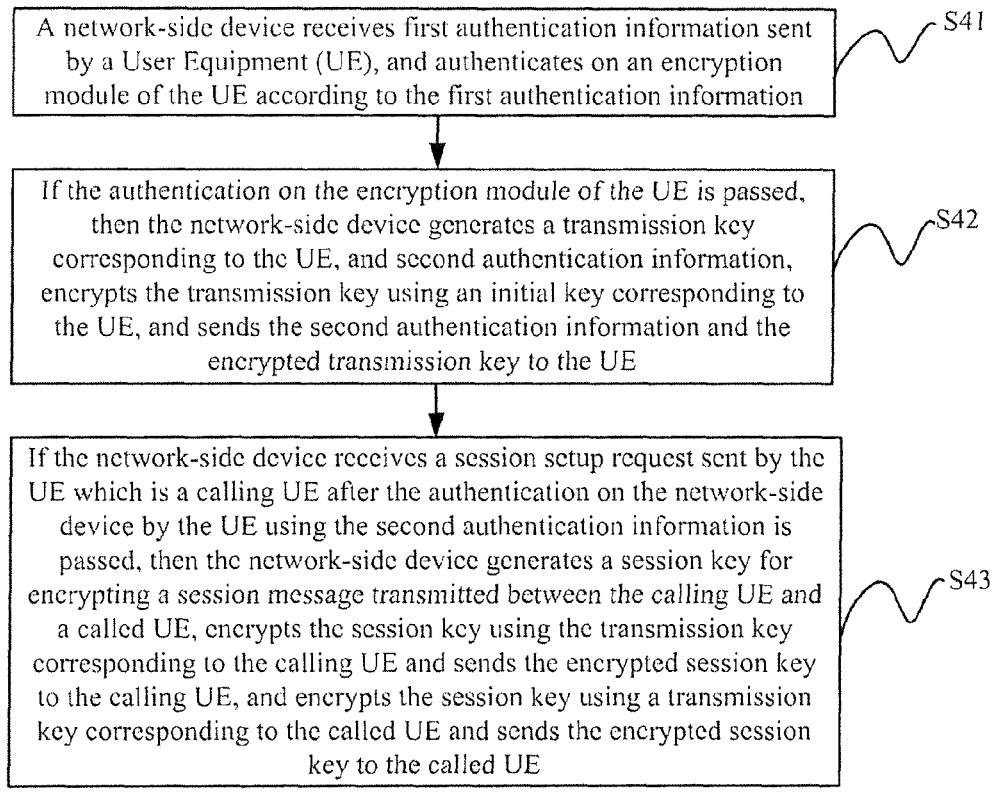
FIG. 4 is a schematic flow chart of an encrypted communication method according to an embodiment of the invention.

As illustrated in FIG. 4, an encrypted communication method at the network side according to an embodiment of the invention includes:

S41. A network-side device receives first authentication information sent by a User Equipment (UE), and authenticates on an encryption module of the UE according to the first authentication information;

S42. If the authentication on the encryption module of the UE is passed, then the network-side device generates a transmission key corresponding to the UE, and second authentication information, encrypts the transmission key using an initial key corresponding to the UE, and sends the second authentication information and the encrypted transmission key to the UE, where the second authentication information is used by the UE to authenticate on the network-side device; and S43. If the network-side device receives a session setup request sent by the UE which is a calling UE after the authentication on the network-side device by the UE using the second authentication information is passed, then the network-side device generates a session key for encrypting a session message transmitted between the calling UE and a called UE, encrypts the session key using the transmission key corresponding to the calling UE and sends the encrypted session key to the calling UE, and encrypts the session key using a transmission key corresponding to the called UE and sends the encrypted session key to the called UE.

Preferably in the step S41, the first authentication information includes a UE identifier, a subscriber password hash value, a random number, an encrypted random number, and a Message Authentication Code (MAC) value corresponding to the encrypted random number calculated from a subscriber password, where the encrypted random number is a random number encrypted using the initial key corresponding to the UE.

Preferably in the step S41, the network-side device authenticates on the encryption module of the UE according to the first authentication information as follows:

The network-side device determines a local subscriber password hash value according to the UE identifier; if the local subscriber password hash value is the same as the subscriber password hash value in the first authentication information, then the network-side device encrypts the random number using the local initial key corresponding to the UE; if the random number encrypted using the local initial key corresponding to the UE is the same as the encrypted random number in the first authentication information, then the network-side device calculates an MAC value corresponding to the encrypted random number using the subscriber password; and if the MAC value is the same as the MAC value in the first authentication information, then the network-side device determines that the authentication on the encryption module of the UE is passed.

Preferably in the step S42, the network-side device generates the second authentication information as follows:

The network-side device encrypts the generated transmission key corresponding to the UE into the encrypted transmission key using the local initial key corresponding to the UE; and The network-side device calculates an MAC value corresponding to the encrypted transmission key from the subscriber password, and determines the MAC value as the second authentication information.

Preferably after the network-side device generates the transmission key corresponding to the UE, the method further includes:

The network-side device creates a correspondence relationship between the transmission key and the UE identifier of the UE corresponding to the transmission key; and The network-side device encrypts the transmission key corresponding to the UE using the subscriber password of the UE, and stores the encrypted transmission key and the correspondence relationship.

Preferably the method further includes:

If the UE initiates an instant messaging service, then the network-side device receives an encrypted first random number, and an encrypted instant message, sent by the UE which is the calling UE, where the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;

The network-side device decrypts the encrypted first random number using the transmission key corresponding to the calling UE, and decrypts the encrypted instant message using the transmission key corresponding to the calling UE, and the first random number;

The network-side device generates an instant message key, encrypts the instant message key into the encrypted instant message key using the transmission key corresponding to the called UE, and encrypts the instant message into the encrypted instant message using the instant message key; and The network-side device sends the encrypted instant message key and the encrypted instant message to the called UE.

Figure 5:
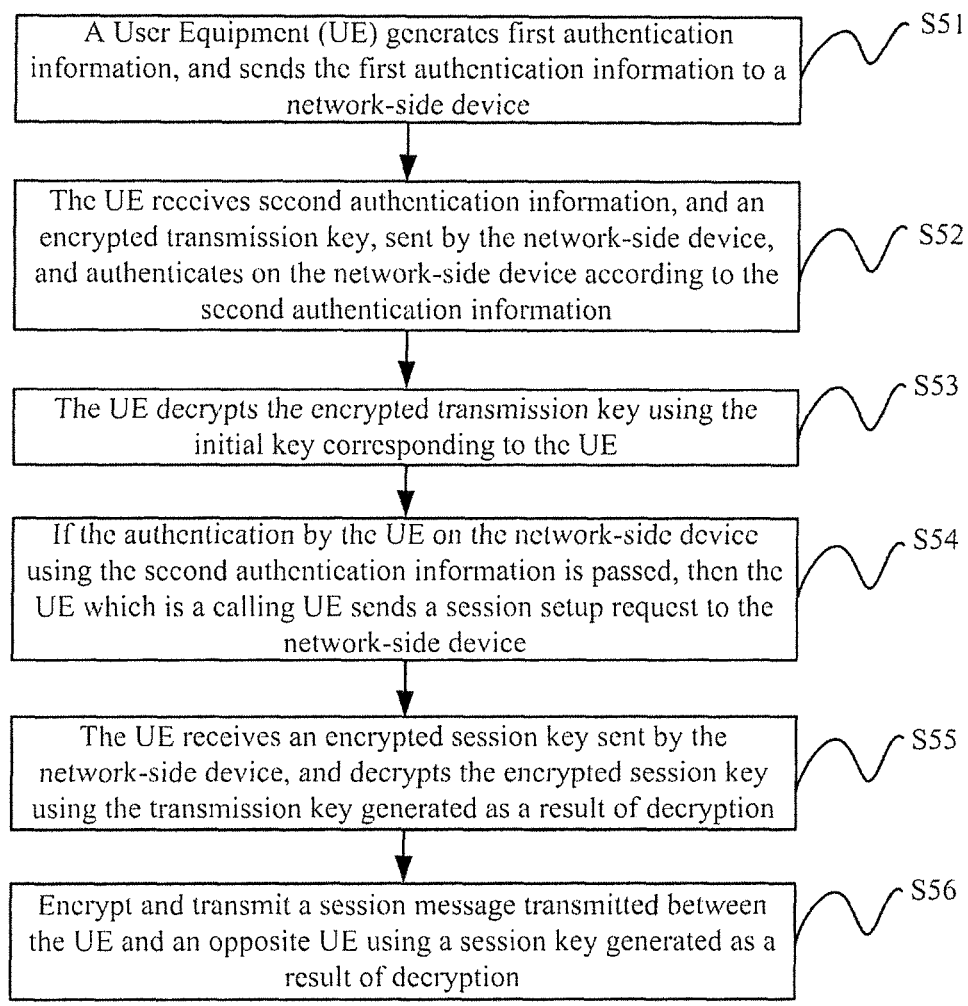
FIG. 5 is a schematic flow chart of an encrypted communication method according to an embodiment of the invention.

As illustrated in FIG. 5, an encrypted communication method at the UE side according to an embodiment of the invention includes:

S51. A User Equipment (UE) generates first authentication information, and provides a network-side device with the first authentication information, where the first authentication information is used by the network-side device to authenticate on an encryption module of the UE;

S52. The UE receives second authentication information, and an encrypted transmission key, sent by the network-side device, and authenticates on the network-side device according to the second authentication information, where the encrypted transmission key is generated by the network-side device encrypting a generated transmission key corresponding to the UE using an initial key corresponding to the UE;

S53. The UE decrypts the encrypted transmission key using the initial key corresponding to the UE;

S54. If the authentication by the UE on the network-side device using the second authentication information is passed, then the UE which is a calling UE sends a session setup request to the network-side device;

S55. The UE receives an encrypted session key sent by the network-side device, and decrypts the encrypted session key using the transmission key generated as a result of decryption; and S56. The UE encrypts and transmits a session message transmitted between the UE and an opposite UE using a session key generated as a result of decryption.

Preferably the first authentication information in the step S51 includes a UE identifier, a subscriber password hash value, a random number, an encrypted random number, and a Message Authentication Code (MAC) value corresponding to the encrypted random number calculated from a subscriber password, where the encrypted random number is a random number encrypted using the initial key corresponding to the UE.

Preferably the second authentication information in the step S52 includes an MAC value corresponding to the encrypted transmission key calculated by the network-side device from the subscriber password, where the encrypted transmission key is generated by the network-side device encrypting the transmission key corresponding to the UE using the initial key corresponding to the UE.

Preferably in the step S52, the UE authenticates on the network-side device according to the second authentication information as follows:

The UE calculates an MAC value corresponding to the encrypted transmission key from the subscriber password, and if the locally calculated MAC value is the same as the MAC value in the second authentication information, then the UE determines that the authentication on the network-side device is passed.

Preferably after the step S53, the method further includes:

The UE encrypts the decrypted transmission key using the subscriber password of the UE, and stores the encrypted transmission key.

Preferably the method further includes:

If the UE which is the calling UE initiates an instant message service, then the calling UE generates randomly a first random number, encrypts the first random number into the encrypted first random number using the transmission key corresponding to the UE, and encrypts an instant message into the encrypted instant message using the transmission key corresponding to the UE, and the first random number;

The calling UE sends the encrypted first random number and the encrypted instant message to the network-side device;

A called UE receives an encrypted instant message key, and the encrypted instant message, sent by the network-side device, where the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and The called UE decrypts the encrypted instant message key into the instant message key using the transmission key corresponding to the called UE, and decrypts the encrypted instant message into the instant message using the instant message key.

Three keys which are the initial key, the transmission key, and the session key are involved in the IMS-based encrypted communication system in the embodiments of the invention, and the encrypted communication methods according to the embodiments of the invention will be described below in details with reference to particular embodiments. The session message transmitted between the calling UE and the called UE in the embodiments of the invention may be a media stream, or the session message may be in another form.

A first embodiment relates to an encrypted user registration flow.

Figure 6:
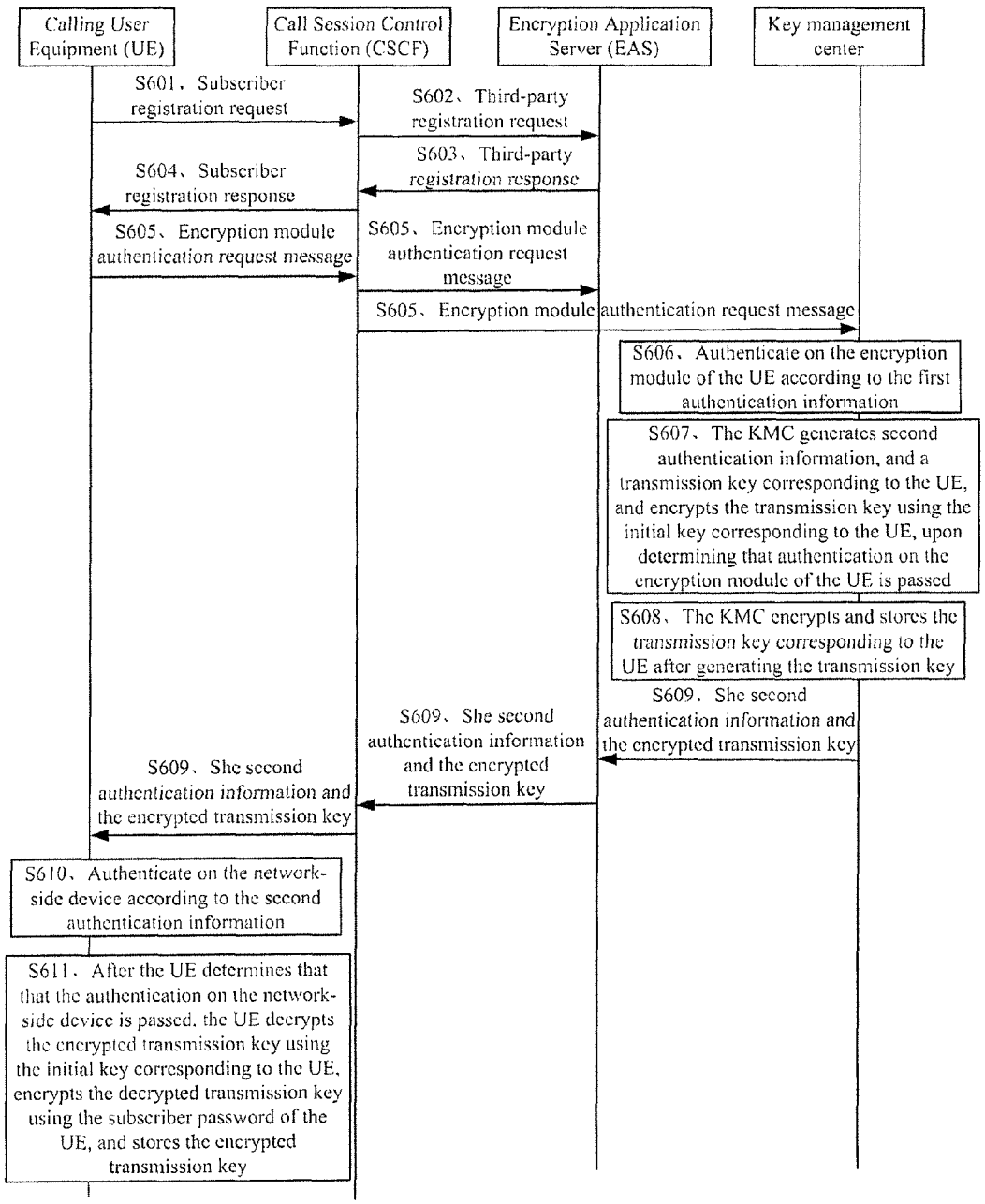
FIG. 6 is a schematic diagram of an encrypted subscriber registration flow in an IMS-based encrypted communication system according to an embodiment of the invention.

As illustrated in FIG. 6, the encrypted user registration flow in the IMS-based encrypted communication system according to the embodiment of the invention is as follows:

S601. As in the standard IMS subscriber registration flow, the UE finishes standard IMS registration under the control of the CSCF after initiating an IMS subscriber registration request;

S602. The CSCF initiates third-party registration to an Encryption Application Server (EAS);

S603. After the EAS finishes the third-party registration, the EAS sends a third-party registration response to the CSCF to indicate that the third-party registration is finished;

S604. The CSCF sends a subscriber registration response message to the UE to notify the UE that the encryption service is registered successfully;

S605. The UE sends an encryption module authentication request message carrying first authentication information to a KMC through the CSCF and the EAS upon reception of the subscriber registration response message to instruct the KMC to authenticate on an encryption module of the UE;

Here the first authentication information includes a UE identifier of the UE, a subscriber password hash value, a random number, an encrypted random number, and a Message Authentication Code (MAC) value corresponding to the encrypted random number calculated from a subscriber password, where the encrypted random number is a random number encrypted using an initial key corresponding to the UE;

S606. The KMC authenticates on the encryption module of the UE according to the first authentication information in the encryption module authentication request message upon reception of the encryption module authentication request message;

The KMC authenticates on the encryption module of the UE in the following steps:

The KMC determines a local subscriber password hash value according to the UE identifier in the first authentication information, and determines whether the local subscriber password hash value is the same as the subscriber password hash value in the first authentication information; and if not, then the authentication by the KMC on the encryption module of the UE fails;

Otherwise, the KMC encrypts the random number using the local initial key corresponding to the UE, and determines whether the random number encrypted using the local initial key corresponding to the UE is the same as the encrypted random number in the first authentication information; and if not, then the authentication by the KMC on the encryption module of the UE fails;

Otherwise, the KMC calculates an MAC value corresponding to the encrypted random number from the subscriber password, and determines whether the MAC value is the same as the MAC value in the first authentication information; and if not, then the authentication by the KMC on the encryption module of the UE fails; otherwise, the KMC determines that the authentication on the encryption module of the UE is passed.

S607. The KMC generates second authentication information, and a transmission key corresponding to the UE, and encrypts the transmission key using the initial key corresponding to the UE, upon determining that authentication on the encryption module of the UE is passed;

Here the second authentication information is used for the UE to authenticate on the network-side device, and the KMC generates the second authentication information as follows: the KMC encrypts the generated transmission key corresponding to the UE into the encrypted transmission key using the local initial key corresponding to the UE; and calculates an MAC value corresponding to the encrypted transmission key from the subscriber password of the UE, and determines the MAC value as the second authentication information;

S608. The KMC encrypts and stores the transmission key corresponding to the UE after generating the transmission key;

Here the KMC encrypts and stores the transmission key as follows: the KMC creates a correspondence relationship between the transmission key and the UE identifier of the UE corresponding to the transmission key; and encrypts the transmission key corresponding to the UE using the subscriber password of the UE, and stores the encrypted transmission key, and the correspondence relationship;

S609. The KMC sends the second authentication information and the encrypted transmission key to the UE through the CSCF and the EAS;

S610. The UE authenticates on the network-side device according to the second authentication information upon reception of the second authentication information and the encrypted transmission key;

Here the UE authenticates on the network-side device according to the second authentication information as follows: the UE calculates an MAC value corresponding to the encrypted transmission key from the subscriber password, and determines whether the MAC value is the same as the MAC value in the second authentication information; and if not, then the UE determines that the authentication on the network-side device fails; otherwise, the UE determines that the authentication on the network-side device is passed;

S611. After the UE determines that that the authentication on the network-side device is passed, the UE decrypts the encrypted transmission key using the initial key corresponding to the UE, encrypts the decrypted transmission key using the subscriber password of the UE, and stores the encrypted transmission key for use in a subsequent encrypted session between the UE and the opposite UE.

The encrypted user registration flow illustrated in FIG. 6 relates to the initial key corresponding to the UE, where both the UE and the network-side device can obtain and store in advance the initial key corresponding to the UE on paper or in a short message or an email, and the UE and the network-side device shall not store the initial key corresponding to the UE in the form of a plaintext (or unencrypted); and in order to improve the security of the system, the UE or the network-side device can store the initial key corresponding to the UE by encrypting the initial key corresponding to the UE using the subscriber password of the UE, and storing the initial key.

In order to guarantee the security of the encrypted communication system, if the security of the encryption module of the UE is low (the security of the encryption module of the UE is determined by an administrator), then the set of initial keys stored in the UE and the KMC can be dynamically updated periodically. If the encryption module of the UE is in an unsecured environment, then the system can destroy remotely the set of encrypted initial keys corresponding to the UE in the KMC, and the set of encrypted initial keys at the UE side.

The encrypted user registration flow illustrated in FIG. 6 relates to the distribution and storage of the keies, and bidirectional authentication between the UE and the network side to thereby improve the security of the IMS-based encrypted communication process.

A second embodiment relates to an encrypted session flow.

Figure 7:
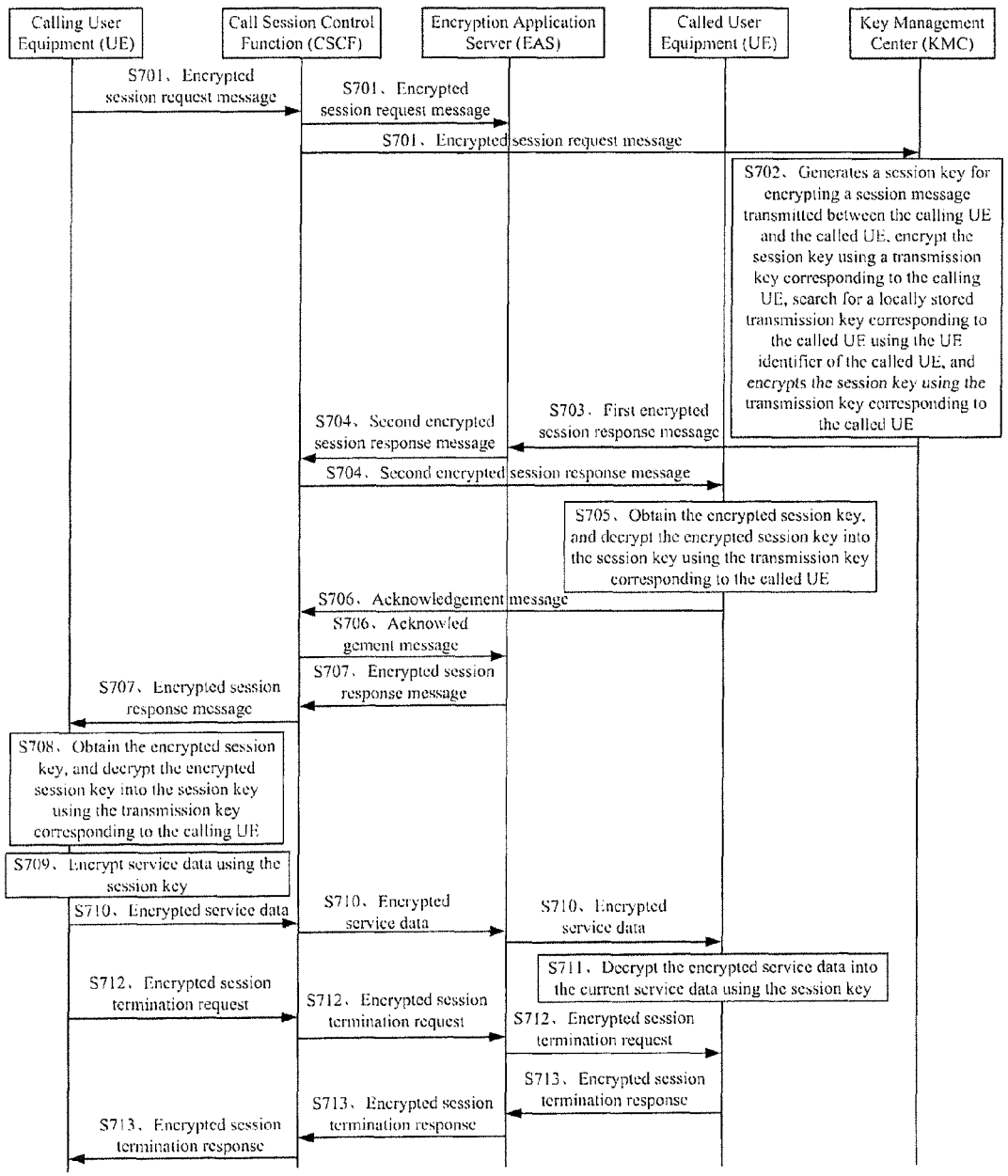
FIG. 7 is a schematic diagram of an encrypted session flow in an IMS-based encrypted communication system according to an embodiment of the invention.

As illustrated in FIG. 7, the encrypted session flow in the IMS-based encrypted communication system according to the embodiment of the invention is as follows:

S701. The calling UE sends an encrypted session request message carrying the UE identifier of the calling UE and the UE identifier of the called UE to the KMC through the CSCF and the EAS;

S702. The KMC generates a session key for encrypting a session message transmitted between the calling UE and the called UE, encrypts the session key using a transmission key corresponding to the calling UE, searches for a locally stored transmission key corresponding to the called UE using the UE identifier of the called UE, and encrypts the session key using the transmission key corresponding to the called UE, upon reception of the encrypted session request message.

S703. The KMC sends an encrypted session response message to the EAS, where the encrypted session response message carries the encryption key encrypted using the transmission key corresponding to the calling UE, and the session key encrypted using the transmission key corresponding to the called UE;

S704. The EAS sends an encrypted session response message carrying the session key encrypted using the transmission key corresponding to the called UE to the called UE through the CSCF;

S705. The called UE obtains the encrypted session key, and decrypts the encrypted session key into the session key using the transmission key corresponding to the called UE, upon reception of the encrypted session response message;

S706. The called UE sends an acknowledgement message to the EAS through the CSCF to indicate that the called UE obtains successfully the session key of the current encrypted session;

S707. The EAS sends an encrypted session response message carrying the session key encrypted using the transmission key corresponding to the calling UE through the CSCF upon reception of the acknowledgement message sent by the called UE;

S708. The calling UE obtains the encrypted session key, and decrypts the encrypted session key into the session key using the transmission key corresponding to the calling UE, upon reception of the encrypted session response message;

So far both the calling UE and the called UE obtain the session key of the current encrypted session, generated by the KMC, and a encrypted session is initiated between the calling UE and the called UE.

S709. The calling UE encrypts service data using the session key;

S710. The calling UE sends the encrypted service data to the called UE through the CSCF and the EAS;

S711. The called UE receives the encrypted service data sent by the calling UE, and decrypts the encrypted service data into the current service data using the session key;

The called UE sends the service data to the calling UE in the same process as the steps S708 and S710, so a repeated description thereof will be omitted here.

During the encrypted session of the calling UE and the called UE, the calling UE and the called UE can obtain normally the service data sent by the opposite UEs, but the intermediate devices (including the CSCF and the EAS) can not obtain the service data because they are not provided with the session key of the current encrypted session, thus greatly improving the security of the encrypted session.

S712. At the end of the current encrypted session, the calling UE sends an encrypted session termination request to the called UE through the CSCF and the EAS; and S713. The called UE sends an encrypted session termination response to the calling UE through the CSCF and the EAS to indicate to the calling UE that the current encrypted session is terminated, upon reception of the encrypted session termination request.

A third embodiment relates to an encrypted instant messaging service flow.

Figure 8:
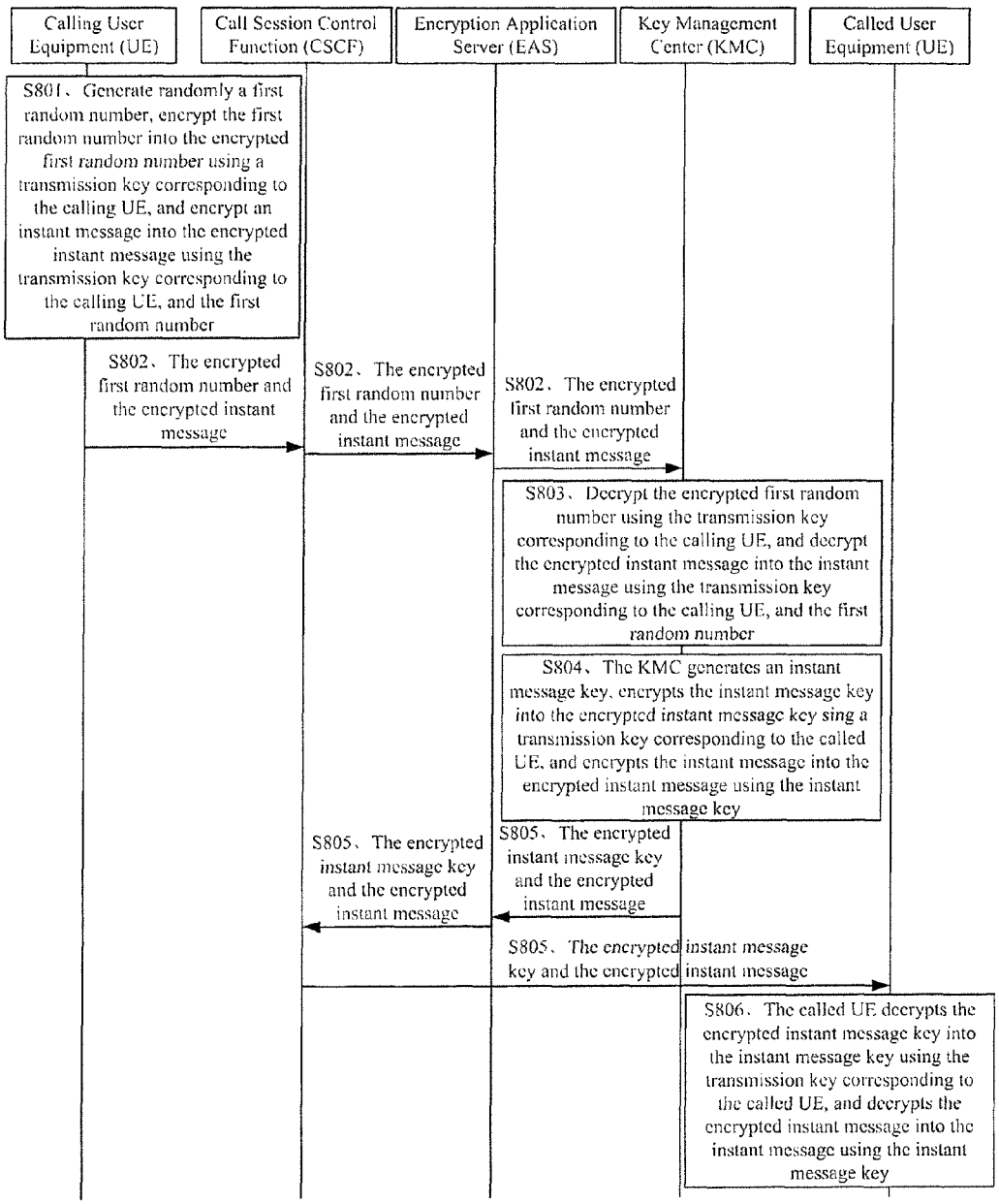
FIG. 8 is a schematic diagram of an encrypted instant messaging service flow in an IMS-based encrypted communication system according to an embodiment of the invention.

As illustrated in FIG. 8, the encrypted instant messaging service flow in the IMS-based encrypted communication system according to the embodiment of the invention is as follows:

S801. The calling UE initiates an instant messaging service by generating randomly a first random number, encrypting the first random number into the encrypted first random number using a transmission key corresponding to the calling UE, and encrypting an instant message into the encrypted instant message using the transmission key corresponding to the calling UE, and the first random number;

S802. The calling UE sends the encrypted first random number and the encrypted instant message to the KMC through the CSCF and the EAS;

S803. The KMC decrypts the encrypted first random number using the transmission key corresponding to the calling UE, and decrypts the encrypted instant message into the instant message using the transmission key corresponding to the calling UE, and the first random number, upon reception of the encrypted first random number and the encrypted instant message;

S804. The KMC generates an instant message key, encrypts the instant message key into the encrypted instant message key using a transmission key corresponding to the called UE, and encrypts the instant message into the encrypted instant message using the instant message key;

S805. The KMC sends the encrypted instant message key and the encrypted instant message to the called UE through the CSCF and the EAS; and S806. The called UE decrypts the encrypted instant message key into the instant message key using the transmission key corresponding to the called UE, and decrypts the encrypted instant message into the instant message using the instant message key, upon reception of the encrypted instant message key and the encrypted instant message.

A fourth embodiment relates to an interface specification between the EAS and the UE.

In the first embodiment to the third embodiment above, a communication protocol between the EAS and the UE is the SIP protocol, where a message header is extended as P-Special-Service in which extended service data are stored, and whether the message header is extended in a message or a response can be determined dependent upon a demand of a particular service.

P-Special-Service can include a number of parameters, each of which is formatted as Parameter Name='Parameter Value', where Parameter Name is consisted of letters including uppercase and lowercase letters; Parameter Value is string of text characters precluding ""; and the parameters are separated by ";", and the last parameter is not followed by ";". 7 parameters are defined in P-Special-Service, and the number of parameters carried in P-Special-Service is determined dependent upon a particular service message in operation. The 7 parameters defined in P-Special-Service are as followed:

P-Special-Service: serviceType='Service Code'; userName='Username'; password='Password Hash value'; RAND='Random Number'; SQN="Random Number Encrypted String"; MAC='Encrypted String MAC value'; and key='Key'.

A service code placed in the parameter Type is defined as: 001 represents authentication; 002 represents key distribution; 003 represents an encrypted session; 004 represents an encrypted instant service; 005 represents key updating; 006 represents key destruction; 100 represents an encrypted service registration failure; and 101 represents a service registration success.

A key is placed in the parameter Key, where the key is an original key, i.e., the initial key corresponding to the UE, the transmission key corresponding to the UE, or the session key corresponding to the UE, and the original key is Base64 encoded text data, the maximum length of which is 172 bytes. A Base64 encoded set of symbols includes the 26 letters including their uppercase and lowercase letters, or the digits 0 to 9, or +, /, =, and other symbols.

P-Special-Service is formatted differently in different services particularly as follows:

In the first embodiment, during authentication by the KMC on the encryption module of the UE, P-Special-Service included in the authentication request message sent by the UE to the EAS is formatted as follows:

P-Special-Service: serviceType='001'; userName='Username'; password='Password Hash value'; RAND='Random Number'; SQN="Random Number Encrypted String"; and MAC='Encrypted String MAC value'.

In the first embodiment, during authentication by the KMC on the encryption module of the UE, P-Special-Service included in the authentication response message sent by the EAS to the UE is formatted as follows:

P-Special-Service: serviceType='002'; MAC='Encrypted String MAC value'; and key='Key'.

Where the parameter key carries the encrypted transmission key, and the MAC carries the Message Authentication Code (MAC) value corresponding to the encrypted random number calculated using the subscriber password.

In the second embodiment, P-Special-Service included in the encrypted session request message sent by the UE to the EAS is formatted as follows:

P-Special-Service: serviceType='003'; and key="Key".

Where the parameter key carries the session key encrypted using the transmission key corresponding to the called UE.

In the second embodiment, P-Special-Service included in the encrypted session response message sent by the UE to the EAS is formatted as follows:

P-Special-Service: serviceType='003'; and key='Key'.

Where the parameter key carries the session key encrypted using the transmission key corresponding to the calling UE.

Taking the encrypted session request message as an example, the encrypted session request message is formatted as follows:

INVITE sip:b@192.168.50.83 SIP/2.0
To: <sip:b@192.168.50.83>
Content-Type: application/sdp
Via: SIP/2.0/UDP 192.168.50.17:5060; wlsscid=17c710cd0;
branch=z9hG4bKeb85b572f3b524b761c4603174ad6dba
P-Served-User: <sip:a@192.168.50.83>:sescase;32 orig
Allow:
INVITE,ACK,CANCEL,OPTIONS,BYE,REFER,NO-TIFY,MESSGAE,SUBSCRIBE,INFO
P-Charging-Function-Addresses: cef=172.16.0.10; ccf=0.0.0.0
Call-ID: wlss-9337ba99-1b5d9e8-5332a8c0-17b6-50029-9e-3f9a0ec6-9e
Max-Forwards: 69
From: <sip:a@192.168.50.83>;tag=04abaddf
Contact:
<sip:192.168.50.17:5060;transport=udp;
wlsscid=17c719cd0;sipappsessionid=app-m4ixtiyn8ckc>
Session-Expires: 1800;refresher=uac
P-Special-Service:type='003';
key='1235abdefa0945defcd09adbjkljkllllkadkslekw'
P-Charging-Vector:
icid-value=4c548924047141b8a87fb0d22c629f4;orig-ioi=cscf.172.16.0.1
CSeq: 1 INVITE
Route: <sip:scscf@192.168.50.17:5060;lr>
Supported: 100rel
Require: 100rel
P-Asserted-Identity: <sip:a@192.168.50.83>
Content-Length:162

Figure 9:
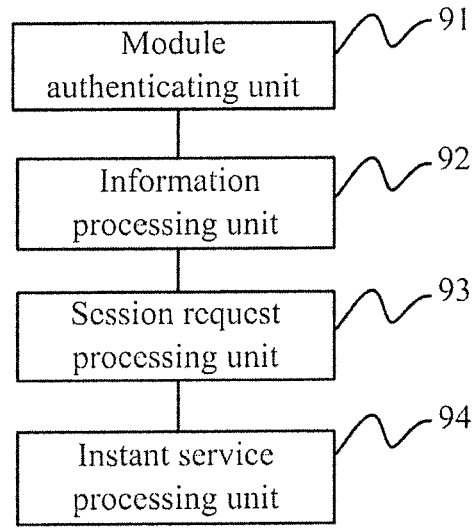
FIG. 9 is a schematic structural diagram of an encrypted communication apparatus according to an embodiment of the invention.

In correspondence to the method above, as illustrated in FIG. 9, an encrypted communication apparatus at the network side according to an embodiment of the invention includes:

A module authenticating unit 91 is configured to receive first authentication information sent by a User Equipment (UE), and to authenticate on an encryption module of the UE according to the first authentication information;

An information processing unit 92 is configured, if the authentication on the encryption module of the UE is passed, to generate a transmission key corresponding to the UE, and second authentication information, to encrypt the transmission key using an initial key corresponding to the UE, and to send the second authentication information and the encrypted transmission key to the UE, where the second authentication information is used by the UE to authenticate on the network-side device; and A session request processing unit 93 is configured, if a session setup request sent by the UE which is a calling UE is received, after the authentication on the network-side device by the UE using the second authentication information is passed, to generate a session key for encrypting a session message transmitted between the calling UE and a called UE, to encrypt the session key using the transmission key corresponding to the calling UE and to send the encrypted session key to the calling UE, and to encrypt the session key using a transmission key corresponding to the called UE and to send the encrypted session key to the called UE.

Preferably the first authentication information includes a UE identifier, a subscriber password hash value, a random number, an encrypted random number, and a Message Authentication Code (MAC) value corresponding to the encrypted random number calculated from a subscriber password, where the encrypted random number is a random number encrypted using the initial key corresponding to the UE.

Preferably the module authenticating unit 91 configured to authenticate on the encryption module of the UE using the first authentication information is configured:

To determine a local subscriber password hash value according to the UE identifier; if the local subscriber password hash value is the same as the subscriber password hash value in the first authentication information, to encrypt the random number using the local initial key corresponding to the UE; if the random number encrypted using the local initial key corresponding to the UE is the same as the encrypted random number in the first authentication information, to calculate an MAC value corresponding to the encrypted random number using the subscriber password; and if the MAC value is the same as the MAC value in the first authentication information, to determine that the authentication on the encryption module of the UE is passed.

Preferably the information processing unit 92 configured to generate the second authentication information is configured:

To encrypt the generated transmission key corresponding to the UE into the encrypted transmission key using the local initial key corresponding to the UE; and To calculate an MAC value corresponding to the encrypted transmission key from the subscriber password, and to determine the MAC value as the second authentication information.

Preferably the information processing unit 92 is further configured, after the transmission key corresponding to the UE is generated, to:

To create a correspondence relationship between the transmission key and the UE identifier of the UE corresponding to the transmission key; and To encrypt the transmission key corresponding to the UE using the subscriber password of the UE, and to store the encrypted transmission key and the correspondence relationship.

Preferably the apparatus further includes:

An instant service processing unit 94 is configured, if the UE initiates an instant messaging service, to receive an encrypted first random number, and an encrypted instant message, sent by the UE which is the calling UE, where the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;

To decrypt the encrypted first random number using the transmission key corresponding to the calling UE, and to decrypt the encrypted instant message using the transmission key corresponding to the calling UE, and the first random number;

To generate an instant message key, to encrypt the instant message key into the encrypted instant message key using the transmission key corresponding to the called UE, and to encrypt the instant message into the encrypted instant message using the instant message key; and To send the encrypted instant message key and the encrypted instant message to the called UE.

Particularly the module authenticating unit 91, the information processing unit 92, the session request processing unit 93, and the instant service processing unit 94 can be embodied as a processor, and a transmission module capable of transmitting and receiving, and for example, the transmission module capable of transmitting and receiving can be a dedicated chip, an antenna, or another device, but the invention will not be limited to the entities embodying these units.

Figure 10:
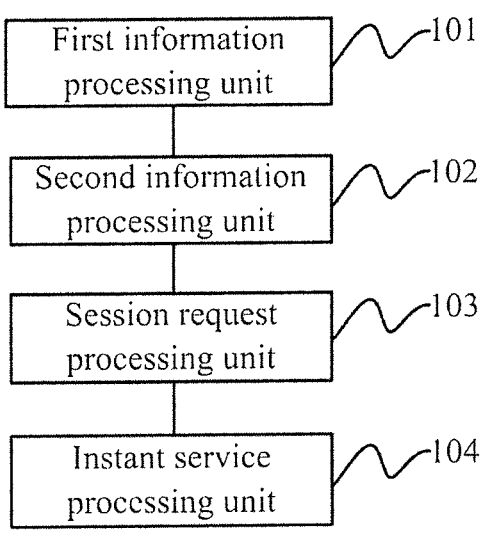
FIG. 10 is a schematic structural diagram of an encrypted communication apparatus according to an embodiment of the invention.

As illustrated in FIG. 10, an encrypted communication apparatus at the UE side according to an embodiment of the invention includes:

A first information processing unit 101 is configured to generate first authentication information, and to send the first authentication information to a network-side device, where the first authentication information is used by the network-side device to authenticate on an encryption module of the UE;

A second information processing unit 102 is configured to receive second authentication information, and an encrypted transmission key, sent by the network-side device, and to authenticate on the network-side device according to the second authentication information, where the encrypted transmission key is generated by the network-side device encrypting a generated transmission key corresponding to the UE using an initial key corresponding to the UE; and to decrypt the encrypted transmission key using the initial key corresponding to the UE; and A session request processing unit 103 is configured, if the authentication on the network-side device using the second authentication information is passed, to send a session setup request to the network-side device; to receive an encrypted session key sent by the network-side device, and to decrypt the encrypted session key using the transmission key generated as a result of decryption; and to encrypt and transmit a session message transmitted between the UE and an opposite UE using a session key generated as a result of decryption.

Preferably the first authentication information includes a UE identifier, a subscriber password hash value, a random number, an encrypted random number, and a Message Authentication Code (MAC) value corresponding to the encrypted random number calculated from a subscriber password, where the encrypted random number is a random number encrypted using the initial key corresponding to the UE.

Preferably the second authentication information includes an MAC value corresponding to the encrypted transmission key calculated by the network-side device from the subscriber password, where the encrypted transmission key is generated by the network-side device encrypting the transmission key corresponding to the UE using the initial key corresponding to the UE.

Preferably the second information processing unit 102 configured to authenticate on the network-side device according to the second authentication information is configured:

To calculate an MAC value corresponding to the encrypted transmission key from the subscriber password, and if the locally calculated MAC value is the same as the MAC value in the second authentication information, to determine that the authentication on the network-side device is passed.

Preferably the second information processing unit 102 is further configured, after the encrypted transmission key is decrypted using the initial key corresponding to the UE, to:

To encrypt the decrypted transmission key using the subscriber password of the UE, and to store the encrypted transmission key.

Preferably the apparatus further includes:

An instant service processing unit 104 is configured, if an instant message service is initiated, to generate randomly a first random number, to encrypt the first random number into the encrypted first random number using the transmission key corresponding to the UE, and to encrypt an instant message into the encrypted instant message using the transmission key corresponding to the UE, and the first random number;

To send the encrypted first random number and the encrypted instant message to the network-side device;

To receive an encrypted instant message key, and the encrypted instant message, sent by the network-side device, where the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and To decrypt the encrypted instant message key into the instant message key using the transmission key corresponding to the UE, and to decrypt the encrypted instant message into the instant message using the instant message key.

Particularly the first information processing unit 101, the second information processing unit 102, the session request processing unit 103, and the instant service processing unit 104 can be embodied as a processor, and a transmission module capable of transmitting and receiving, and for example, the transmission module capable of transmitting and receiving can be a dedicated chip, an antenna, or another device, but the invention will not be limited to the entities embodying these units.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An encrypted communication method, the method comprising:

receiving, by a network-side device, first authentication information sent by a User Equipment (UE), and authenticating on an encryption module of the UE according to the first authentication information;

if the authentication on the encryption module of the UE is passed, then generating, by the network-side device, a transmission key corresponding to the UE, and second authentication information, encrypting the transmission key using an initial key corresponding to the UE, and sending the second authentication information and the encrypted transmission key to the UE, wherein the second authentication information is used by the UE to authenticate on the network-side device; and if the network-side device receives a session setup request sent by the UE which is a calling UE after the authentication on the network-side device by the UE using the second authentication information is passed, then generating, by the network-side device, a session key for encrypting a session message transmitted between the calling UE and a called UE, encrypting the session key using the transmission key corresponding to the calling UE and sending the encrypted session key to the calling UE, and encrypting the session key using a transmission key corresponding to the called UE and sending the encrypted session key to the called UE.

2. The method according to claim 1, wherein the first authentication information comprises a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

3. The method according to claim 2, wherein authenticating, by the network-side device, on the encryption module of the UE according to the first authentication information comprises:

determining a local subscriber password hash value according to the UE identifier; if the local subscriber password hash value is the same as the subscriber password hash value in the first authentication information, then encrypting the random number using the local initial key corresponding to the UE; if the random number encrypted using the local initial key corresponding to the UE is the same as the encrypted random number in the first authentication information, then calculating an MAC value corresponding to the encrypted random number using the subscriber password; and if the MAC value is the same as the MAC value in the first authentication information, then determining that the authentication on the encryption module of the UE is passed.

4. The method according to claim 1, wherein generating, by the network-side device, the second authentication information comprises:

encrypting the generated transmission key corresponding to the UE into the encrypted transmission key using the local initial key corresponding to the UE; and calculating an MAC value corresponding to the encrypted transmission key from the subscriber password, and determining the MAC value as the second authentication information.

5. The method according to claim 4, wherein after the network-side device generates the transmission key corresponding to the UE, the method further comprises:

creating a correspondence relationship between the transmission key and the UE identifier of the UE corresponding to the transmission key; and encrypting the transmission key corresponding to the UE using the subscriber password of the UE, and storing the encrypted transmission key and the correspondence relationship;

the method further comprises:

if the UE initiates an instant messaging service, then receiving, by the network-side device, an encrypted first random number, and an encrypted instant message, sent by the UE which is the calling UE, wherein the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;

decrypting, by the network-side device, the encrypted first random number using the transmission key corresponding to the calling UE, and decrypting the encrypted instant message using the transmission key corresponding to the calling UE, and the first random number;

generating, by the network-side device, an instant message key, encrypting the instant message key into the encrypted instant message key using the transmission key corresponding to the called UE, and encrypting the instant message into the encrypted instant message using the instant message key; and sending, by the network-side device, the encrypted instant message key and the encrypted instant message to the called UE.

6. An encrypted communication method, comprising:

generating, by a User Equipment (UE), first authentication information, and sending the first authentication information to a network-side device, wherein the first authentication information is used by the network-side device to authenticate on an encryption module of the UE;

receiving, by the UE, second authentication information, and an encrypted transmission key, sent by the network-side device, and authenticating on the network-side device according to the second authentication information, wherein the encrypted transmission key is generated by the network-side device encrypting a generated transmission key corresponding to the UE using an initial key corresponding to the UE;

decrypting, by the UE, the encrypted transmission key using the initial key corresponding to the UE;

if the authentication by the UE on the network-side device using the second authentication information is passed, then sending, by the UE which is a calling UE, a session setup request to the network-side device;

receiving, by the UE, an encrypted session key sent by the network-side device, and decrypting the encrypted session key using the transmission key generated as a result of decryption; and encrypting and transmitting, by the UE, a session message transmitted between the UE and an opposite UE using a session key generated as a result of decryption.

7. The method according to claim 6, wherein the first authentication information comprises a UE identifier, a subscriber password hash value, a random number, an encrypted random number, and a Message Authentication Code (MAC) value corresponding to an encrypted random number calculated from a subscriber password, where the encrypted random number is a random number encrypted using the initial key corresponding to the UE.

8. The method according to claim 6, wherein the second authentication information comprises an MAC value corresponding to the encrypted transmission key calculated by the network-side device from the subscriber password, where the encrypted transmission key is generated by the network-side device encrypting the transmission key corresponding to the UE using the initial key corresponding to the UE;

authenticating, by the UE, on the network-side device according to the second authentication information comprises:

calculating an MAC value corresponding to the encrypted transmission key from the subscriber password, and if the locally calculated MAC value is the same as the MAC value in the second authentication information, then determining that the authentication on the network-side device is passed.

9. The method according to claim 6, wherein after the TIE decrypts the encrypted transmission key using the initial key corresponding to the UE, the method further comprises:
encrypting the decrypted transmission key using the subscriber password of the UE, and storing the encrypted transmission key.

10. The method according to claim 6, wherein the method further comprises:
if the UE which is the calling UE initiates an instant message service, then generating, by the calling UE, a first random number randomly, encrypting the first random number into the encrypted first random number using the transmission key corresponding to the UE, and encrypting an instant message into the encrypted instant message using the transmission key corresponding to the UE, and the first random number;
sending, by the calling UE, the encrypted first random number and the encrypted instant message to the network-side device;
receiving, by a called UE, an encrypted instant message key, and the encrypted instant message, sent by the network-side device, wherein the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and
decrypting, by the called UE, the encrypted instant message key into the instant message key using the transmission key corresponding to the called UE, and decrypting the encrypted instant message into the instant message using the instant message key.

11. An encrypted communication apparatus, comprising:
at least one processor; and
a memory communicably connected with the at least one processor for storing instructions executable by the at least one processor, wherein execution of the instructions by the at least one processor causes the at least one processor to:
receive first authentication information sent by a User Equipment (UE), and authenticate on an encryption module of the UE according to the first authentication information;
if the authentication on the encryption module of the UE is passed, generate a transmission key corresponding to the UE, and second authentication information, encrypt the transmission key using an initial key corresponding to the UE, and send the second authentication information and the encrypted transmission key to the UE, wherein the second authentication information is used by the UE to authenticate on the network-side device; and
if a session setup request sent by the UE which is a calling UE is received, after the authentication on the network-side device by the UE using the second authentication information is passed, generate a session key for encrypting a session message transmitted between the calling UE and a called UE, encrypt the session key using the transmission key corresponding to the calling UE and send the encrypted session key to the calling UE, and encrypt the session key using a transmission key corresponding to the called UE and send the encrypted session key to the called UE.

12. The apparatus according to claim 11, wherein the first authentication information comprises a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

13. The apparatus according to claim 12, wherein the execution of the instructions by the at least one processor further causes the at least one processor to:
determine a local subscriber password hash value according to the UE identifier; if the local subscriber password hash value is the same as the subscriber password hash value in the first authentication information, encrypt the random number using the local initial key corresponding to the UE; if the random number encrypted using the local initial key corresponding to the UE is the same as the encrypted random number in the first authentication information, calculate an MAC value corresponding to the encrypted random number using the subscriber password; and if the MAC value is the same as the MAC value in the first authentication information, determine that the authentication on the encryption module of the UE is passed.

14. The apparatus according to claim 11, wherein the execution of the instructions by the at least one processor further causes the at least one processor to:
encrypt the generated transmission key corresponding to the UE into the encrypted transmission key using the local initial key corresponding to the UE; and
calculate an MAC value corresponding to the encrypted transmission key from
the subscriber password, and determine the MAC value as the second authentication information.

15. The apparatus according to claim 14, wherein the execution of the instructions by the at least one processor further causes the at least one processor to:
create a correspondence relationship between the transmission key and the UE identifier of the UE corresponding to the transmission key; and
encrypt the transmission key corresponding to the UE using the subscriber password of the UE, and store the encrypted transmission key and the correspondence relationship;
the execution of the instructions by the at least one processor further causes the at least one processor to:
if the UE initiates an instant messaging service, receive an encrypted first random number, and an encrypted instant message, sent by the UE which is the calling UE, wherein the first random number is generated randomly by the calling UE, the encrypted first random number is generated by the calling UE encrypting the first random number using the transmission key corresponding to the calling UE, and the encrypted instant message is generated by the calling UE encrypting the instant message using the transmission key corresponding to the calling UE, and the first random number;
decrypt the encrypted first random number using the transmission key corresponding to the calling UE, and decrypt the encrypted instant message using the transmission key corresponding to the calling UE, and the first random number;
generate an instant message key, encrypt the instant message key into the encrypted instant message key using the transmission key corresponding to the called UE, and encrypt the instant message into the encrypted instant message using the instant message key; and send the encrypted instant message key and the encrypted instant message to the called UE.

16. An encrypted communication apparatus, comprising:
at least one processor; and
a memory communicably connected with the at least one processor for storing instructions executable by the at least one processor, wherein execution of the instructions by the at least one processor causes the at least one processor to:

generate first authentication information, and send the first authentication information to a network-side device, wherein the first authentication information is used by the network-side device to authenticate on an encryption module of the UE;

receive second authentication information, and an encrypted transmission key, sent by the network-side device, and to authenticate on the network-side device according to the second authentication information, wherein the encrypted transmission key is generated by the network-side device encrypting a generated transmission key corresponding to the UE using an initial key corresponding to the UE; and decrypt the encrypted transmission key using the initial key corresponding to the UE; and if the authentication on the network-side device using the second authentication information is passed, send a session setup request to the network-side device; receive an encrypted session key sent by the network-side device, and decrypt the encrypted session key using the transmission key generated as a result of decryption; and encrypt and transmit a session message transmitted between the UE and an opposite UE using a session key generated as a result of decryption.

17. The apparatus according to claim 16, wherein the first authentication information comprises a UE identifier, a subscriber password hash value, a random number, an encrypted random number, and a Message Authentication Code (MAC) value corresponding to the encrypted random number calculated from a subscriber password, wherein the encrypted random number is a random number encrypted using the initial key corresponding to the UE.

18. The apparatus according to claim 16, wherein the second authentication information comprises an MAC value corresponding to the encrypted transmission key calculated by the network-side device from the subscriber password, wherein the encrypted transmission key is generated by the network-side device encrypting the transmission key corresponding to the UE using the initial key corresponding to the UE;

the execution of the instructions by the at least one processor further causes the at least one processor to:

calculate an MAC value corresponding to the encrypted transmission key from the subscriber password, and if the locally calculated MAC value is the same as the MAC value in the second authentication information, determine that the authentication on the network-side device is passed.

19. The apparatus according to claim 16, wherein the execution of the instructions by the at least one processor further causes the at least one processor to:

encrypt the decrypted transmission key using the subscriber password of the UE, and store the encrypted transmission key.

20. The apparatus according to claim 16, wherein the execution of the instructions by the at least one processor further causes the at least one processor to:

if an instant message service is initiated, generate randomly a first random number, encrypt the first random number into the encrypted first random number using the transmission key corresponding to the UE, and encrypt an instant message into the encrypted instant message using the transmission key corresponding to the UE, and the first random number;

send the encrypted first random number and the encrypted instant message to the network-side device;

receive an encrypted instant message key, and the encrypted instant message, sent by the network-side device, wherein the instant message key is generated by the network-side device, the encrypted instant message key is generated by the network-side device encrypting the instant message key using a transmission key corresponding to the called UE, and the encrypted instant message is generated by the network-side device encrypting the instant message using the instant message key; and decrypt the encrypted instant message key into the instant message key using the transmission key corresponding to the called UE, and decrypt the encrypted instant message into the instant message using the instant message key.

* * * * *